Patented Oct. 19, 1954

2,692,265

UNITED STATES PATENT OFFICE 2,692,265

SUBSTITUTED GLYCINAMIDES

William F. Bruce, Havertown, and Joseph Seifter, Willow Grove, Pa., assignors, by mesne assignments, to American Home Products Corporation, New York, N. Y., a corporation of Delaware No Drawing. Application January 23, 1951, Serial No. 207,450

3 Claims. (Cl. 260—287)

This invention relates to new substituted glycinamides of the type having the formula

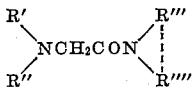

which have been found useful either as intermediates in chemical syntheses or as therapeutic compounds.

The compounds of the invention may be utilized in the preparation of other compounds as for example quaternary ammonium salts, or complex acetamides or fatty acid amides. In addition, compounds falling within the scope of the invention have been found to possess a pharmacological action useful in the medicinal field. In this respect such compounds demonstrate at least one of the following actions: local anesthetic, pressor, depressor, convulsant, spasmolytic, analgesic, soporific or sedative action.

In the graphical formula as given above, R' and R'' are intended to represent alkyl radicals but only alkyls of less than 10 carbon atoms are contemplated. While R' and R'' may be either similar or dissimilar alkyl radicals, dissimilar radicals have been found particularly effective pharmacologically and specifically where R' is a lower alkyl and R'' represents a higher, branched-chain alkyl.

Considering now the radical

this is intended to represent a nitrogen-containing heterocyclic radical where R''' and R'''' stand for non-metallic atoms capable of completing a heterocyclic nucleus, the entire ring including the nitrogen atom above indicated comprising 5 and 6 membered heterocyclics.

As examples of five membered rings contemplated by this invention may be mentioned compounds of the following series: the thiazolidines, the oxazolidines, the triazoles, the reduced pyrroles and imidazoles. As examples of six membered rings contemplated by the invention may be mentioned compounds of the following series: the piperidines, the reduced isoquinilines, the morpholines, the thiomorpholines, the phenoxazines, the phenthiazines, etc. The 5 or 6 membered ring may have a benzene nucleus fused to the ring, as for example, benzotriazole. The ring may contain in addition to nitrogen, oxygen or sulfur as part of the ring structure. Moreover, the aralkyl, alkyl, oxy, hydroxy and alkoxy derivatives of the ring are also contemplated as for example the alkyl piperidines. The important limitation is, however, that when

represents a nitrogen-containing heterocyclic, the heterocyclic compound used to form the substituted glycinamide must have the reaction of a secondary amine. That is, one nitrogen in the ring must have a replaceable hydrogen atom.

In general, the compounds of the invention may be synthesized by reacting an appropriate chloracetamide corresponding to the formula

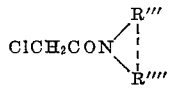

with an appropriate secondary amine corresponding to the formula R'R''NH where R' and R'' and

represent the radicals as indicated hereinbefore.

The secondary amine may be prepared in the usual and known manner. The preferred method for the preparation of the chloracetamide intermediate involves reacting chloracetyl chloride with a heterocyclic amine

in the presence of benzene, toluene, chloroform or ether as a solvent for the reactants. Heating may or may not be necessary depending on the speed of the particular reaction. The chloracetamide remains in solution in the solvent and is obtained by distilling off the solvent under reduced pressure. In general, a molar ratio of chloride to amine of about 1:2 is preferred for the reaction.

The reaction of the appropriate chloracetamide and the appropriate secondary amine to form the desired substituted glycinamide is preferably operated with a molar ratio, amide to amine of about 1:1 and is carried out in the presence of a solvent for the reactants such as higher alcohols having four to seven carbon atoms in the molecule, dioxane or hydrocarbon solvents such as xylene. The reaction is carried out in the presence of an acid acceptor or mildly basic material such as alkali or alkaline earth metal carbonates, sodium bicarbonate or alkali metal alcoholates and preferably about 2 to 3 mols of this material is used. Pyridine may also be used as an acid binding agent in a molar ratio of 1:1. The reaction operation is set up for refluxing and the reaction temperature is the refluxing temperature of the particular solvent selected. Generally, a reaction or refluxing time of about 10-15 hours is sufficient for complete reaction. In the event that solids are formed these are removed by filtration, the substituted glycinamide product remaining in solution in the solvent. The solvent is finally removed by distillation at low pressures to obtain the desired product.

It is known that certain amines possess a vasoconstrictor action and are identified as pressor amines. As an important feature of the invention it has been discovered that when pressor amines, represented particularly by the above-mentioned

amines, are used in the reaction, the new products possess pronounced physiological action. Thus, in these substituted glycinamides, when a pressor amine has been combined with the chloracetamide, the compounds usually possess considerable anesthetic action.

The following examples are illustrative of the method of preparation of representative compounds falling within the scope of the invention.

EXAMPLE 1

*Preparation of alpha-diethylamino acetyl morpholine*

In first preparing the chloracetamide intermediate, a solution of 35 grams of morpholine in 100 cc. of benzene was slowly added with stirring to a solution of 23 grams of chloracetyl chloride in 100 cc. of benzene. After cooling, the precipitate of morpholine hydrochloride was separated on a filter and the filtrate was concentrated in vacuo. The product distilled from 152-160° C. at 6 mm. pressure and was a colorless viscous oil. The yield of N-alpha-chloracetylmorpholine was 35 grams.

A solution of 10 grams of N-alpha-chloracetomorpholine and 9 grams of diethylamine in 30 cc. of n-butanol together with 8 grams of sodium carbonate was refluxed for 12 hours. The solids were filtered off and the filtrate was concentrated in vacuo and distilled. The product, alpha-diethylamino acetylmorpholine boiled at 156-166° C. at a pressure of 24 mm. The yield was 7.4 grams.

EXAMPLE 2

*Preparation of alpha-diamylamino acetylmorpholine*

A solution of 10 grams of N-alpha-chloracetylmorpholine (prepared as in Example 1) and 9.4 grams of diamylamine in 30 cc. of n-butanol together with 8 grams of sodium carbonate was refluxed for 12 hours. The solids were filtered off and the filtrate concentrated in vacuo and distilled. The product, alphadiamylamino acetylmorpholine boiled at 202-205° C. at a pressure of 15 mm. The yield was 10.5 grams.

EXAMPLE 3

*Preparation of N-methyl-N-2-heptylamino-2-acetyl-1,2,3,4-tetrahydro-3-methyl isoquinoline*

The compound N-chlor-aceto-3-methyl-1,2,3,4-tetrahydro-isoquinoline was first prepared in the following manner.

To 250 cc. of toluene contained in a 500 cc. three-neck flask equipped with a mechanical stirrer and dry ice bath was added 45 grams of 3-methyl-1,2,3,4 tetrahydro isoquinoline, 30 grams of pyridine and 35 grams of chloracetylchloride, the latter being dropped in slowly to keep the temperature between 20° and 30° C. The mixture was allowed to warm to room temperature with stirring. It was then washed four times with water and dried with magnesium sulfate. The toluene was next concentrated.

To 300 cc. of butanol contained in a one liter three-neck flask, equipped with a mechanical stirrer and reflux condenser was added 28 grams of N-methyl-2-amino heptane, 45 grams of crude chloro aceto 1,2,3,4 tetrahydro-3-methyl isoquinoline and 25 grams of dry sodium carbonate.

The reaction mixture was refluxed overnight and then filtered hot to remove inorganic salts. The Beilstein test was negative and the alcohol concentrated under vacuum. The product was distilled. B. P. 190-3° at 1.1 mm. $N_D^{17}$ 1.5210.

It will be noted that Examples 1 and 2 illustrate the use of dialkyl amines where both alkyl radicals are lower alkyls and similar, while Example 3 is illustrative of the use of a dialkyl amine where the alkyl radicals are dissimilar and one alkyl is a higher, branched-chain radical. Obviously other alkyl amines may be used as reactants with chloracetyl chloride using the same molar proportions as illustrated and described above, and operating under the disclosed reaction conditions. The alkyls may be either straight chain or branched and for solubility reasons alkyls of higher than 9 carbon atoms are not contemplated.

Again considering the examples, while morpholine and a tetrahydro isoquinoline compound were used as illustrative of the procedure, it should be clear that other 5 or 6 membered heterocyclics as described earlier may be used where such heterocyclics contain a replaceable hydrogen atom attached to a nitrogen in the ring. Thus, merely as examples, one may use thiomorpholine, 2-benzyl-imidazoline or 2(naphthyl-(1')-methyl)-imidazoline, the piperidines, etc. There is no material departure from the illustrative processes when using other heterocyclics, the conditions remaining as disclosed and one merely using similar molar proportions of the selected heterocyclic.

Substantially all of the products of the invention are high boiling basic liquids of limited solubility. It is contemplated that while the products may be used in the basic form, it is within the scope of the invention that they may be prepared and used in the form of their acid-addition salts. The preparation of an acid-addition salt is well-known and generally involves the addition of the selected acid to an ether, alcohol or water solution of the basic material. When medicinal compounds are contemplated, the acid is chosen to yield a salt which is known to those skilled in the art as being physiologically non-toxic. As examples, the hydrochloride, sulfate or acetate salts of the products may be used.

It is further contemplated that those substituted glycinamides which are less soluble in dilute acid than 0.5% by weight or the non-toxic salts thereof, may be brought into satisfactory solution by the use of solubilizing, surface-active, emulsifying or detergent agents in order to obtain a more complete physiological effect of the specific substituted glycinamide. Lipoid solvents having a physiologically non-toxic effect such as long-chain fatty acid partial esters of hexitol anhydrides or oxyalkylene derivatives thereof, vegetable and animal oils and ointment bases such as petroleum jelly and cholesterol are examples of solvents that have been found useful in admixture with the substituted glycinamides for obtaining an enhanced physiological effect.

Many modifications of the invention will be apparent to those skilled in the art without departure therefrom or from the scope of the claims, and since the foregoing disclosure has been given by way of example for clearness and understanding only, no unnecessary limitations should be understood and the appended claims should be construed as broadly as the state of the art permits.

This application is a continuation-in-part of application Serial No. 683,144, filed July 12, 1946, which is now abandoned.

We claim:
1. New compounds of the group consisting of substituted glycinamides having the formula

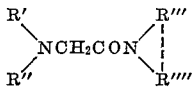

wherein R' stands for a lower alkyl, and R'' represents an alkyl of 2 to 7 carbon atoms while

stands for a heterocyclic radical of the group consisting of a morpholine and a 1,2,3,4-tetrahydro-3-lower alkyl isoquinoline radical; and the non-toxic acid addition salts thereof.

2. New compounds of the group consisting of substituted gylcinamides having the formula

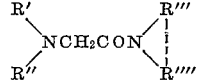

wherein R' stands for a lower alkyl, and R'' represents an alkyl of 2 to 7 carbon atoms while

stands for a 1,2,3,4-tetrahydro-3-lower alkyl isoquinoline radical.

3. The new compound, N-methyl-N-2-heptyl-amino-2-acetyl-1,2,3,4-tetrahydro-3-methyl isoquinoline.

References Cited in the file of this patent
UNITED STATES PATENTS

| Number | Name | Date |
|---|---|---|
| 2,139,190 | Iselin et al. | Dec. 6, 1938 |
| 2,295,655 | Hentrich et al. | Sept. 15, 1942 |
| 2,411,662 | Martin et al. | Nov. 26, 1946 |
| 2,441,498 | Lofgren et al. | May 11, 1948 |
| 2,456,911 | Bruce | Dec. 21, 1948 |
| 2,494,083 | Bruce | Jan. 10, 1950 |
| 2,516,674 | Bruce et al. | July 25, 1950 |
| 2,568,141 | Bruce et al. | Sept. 18, 1951 |